United States Patent [19]

Smeggil

[11] 4,042,341

[45] Aug. 16, 1977

[54] MAGNETIC FILMS OF TRANSITION METAL-RARE EARTH ALLOYS

[75] Inventor: John G. Smeggil, Elnora, N.Y.

[73] Assignee: General Electric Company, Schenectady, N.Y.

[21] Appl. No.: 621,639

[22] Filed: Oct. 10, 1975

Related U.S. Application Data

[62] Division of Ser. No. 406,310, Oct. 15, 1973, abandoned.

[51] Int. Cl.[2] .......................... B32B 15/04; B32B 9/04

[52] U.S. Cl. .................................... 428/678; 428/336; 428/467; 428/900; 428/539; 427/130; 427/132; 428/220; 428/268; 428/283; 428/433; 340/174 YC; 360/134; 428/928; 428/938

[58] Field of Search ............... 428/539, 469, 500, 900, 428/144, 336, 467, 433; 29/183.5, 196.3, 198, 199; 427/128, 132, 130

[56] References Cited

U.S. PATENT DOCUMENTS

| | | | |
|---|---|---|---|
| 2,654,681 | 10/1953 | Lueck | 428/539 X |
| 3,186,950 | 6/1965 | Borchardt | 428/539 X |
| 3,205,092 | 9/1965 | Rosenberg | 428/539 X |
| 3,682,766 | 8/1972 | Maher | 428/539 X |
| 3,932,688 | 1/1976 | Sugita et al. | 428/539 X |

*Primary Examiner*—P. C. Ives

*Attorney, Agent, or Firm*—Jane M. Binkowski; Joseph T. Cohen; Jerome C. Squillaro

[57] ABSTRACT

A method of preparing a magnetic member composed of a non-magnetic substrate carrying a magnetic film of a transition metal-rare earth alloy comprising decomposing a rare earth metal compound below 1,000° C to form a layer of rare earth metal on a substrate, decomposing a transition metal compound below 1,000° C to form a layer of transition metal on the deposited rare earth metal, heating the metals to form an alloy thereof which has its preferred axis of magnetization substantially aligned and in a direction perpendicular to the plane of the substrate and magnetizing the film.

6 Claims, No Drawings

MAGNETIC FILMS OF TRANSITION METAL-RARE EARTH ALLOYS

This is a division, of application Ser. No. 406,310, filed Oct. 15, 1973, abandoned.

The present invention relates to the formation of magnetic films of transition metal-rare earth alloys. In particular, it relates to the formation of a magnetic member composed of a non-magnetic substrate carrying a magnetic film of a transition metal-rare earth alloy, particularly a cobalt-rare earth alloy.

There are a number of problems inherent in the formation of magnetic films of transition metal-rare earth alloys. As a practical matter, sputtering and other types of electron beam evaporation cannot be used because the rare earth metal is very reactive in the sputtering and/or electron beam evaporation atmosphere, and accordingly, getters a very substantial amount of residual oxygen unless elaborate precautions against this happening are taken. Also, the use of either of these techniques does not give uniform, pore-free coherent coatings, particularly when complex geometries are involved.

Conventional evaporation techniques also have a number of drawbacks. One drawback is that the transition metals useful herein have very high melting points. Specifically, cobalt melts at 1,480°, iron at 1530° C., manganese at 1260° and nickel at 1452° C. Such high melting points require that a substrate have an even higher melting point thereby limiting it to a very few expensive materials which are sufficiently inert for conditions of deposition. Also, except for samarium, the rare earth elements have extremely low vapor pressures regardless of the temperatures used making vapor deposition of these elements impractical.

The present invention allows the effective deposition of substantially uniform layers of transition metal and rare earth metal at temperatures below 1000° C. in the desired thicknesses. Such low deposition temperatures allow the use of a multitude of substrate materials. These deposited layers are heated and alloyed to form a continuous coherent substantially uniform film of the desired alloy and such alloy film, when magnetized, has properties satisfactory for a wide range of magnetic applications. No water vapor or oxygen gas is present to degrade the magnetic properties of the alloy.

Briefly stated, the process of the present invention comprises providing a non-magnetic substrate, providing a rare earth metal compound which is decomposible at a temperature below 1000° C. at atmospheric pressure to yield the rare earth metal vapor, contacting the resulting rare earth metal vapor with said non-magnetic substrate to deposit a layer of the rare earth metal thereon, providing a transition metal compound which is decomposible below 1,000° C. at atmospheric pressure to yield the transition metal vapor, heating said transition metal compound to decompose it and yield the transition metal vapor, contacting the resulting transition metal vapor with said deposited layer of rare earth metal to deposit substantially coextensively thereon a layer of the transition metal, heating the deposited layers to produce an alloy thereof in the form of a continuous film, said alloy having a substantial amount of its easy axis of magnetization perpendicular to the plane of the substrate, and applying to said alloy film below its Curie temperature a magnetic field parallel to its easy axis which has a magnitude that saturates the film.

In the present process a film of a magnetic transition metal-rare earth alloy, e.g., TRE, where T is a transition metal is RE is a rare earth metal, is formed. The transition metal is selected from the group consisting of cobalt, iron, nickel, manganese and alloys thereof. The rare earth metal is one of the 15 elements of the lanthanide series having atomic numbers 57 and 71 inclusive as well as the element yttrium (atomic number 39) which is commonly included in this group of 39) and which, in this specification, is considered a rare earth metal. The present magnetic film can be composed of a plurality of metals depending upon the particular properties desired.

Transition metal-rare earth intermetallic alloys or compounds exist in a variety of phases and each phase may vary in composition. A material substantially comprised of the $T_5RE$ single phase is particularly preferred in the present invention since this phase has shown the most desirable combination of magnetic properties.

Films of the cobalt-rare earth alloys, are particularly preferred due to their desirable permanent magnet properties. Representative of the cobalt-rare earth compounds or alloys useful in the present invention are cobalt-cerium, cobalt-praseodymium, cobalt-neodymium, cobalt-promethium, cobalt-samarium, cobalt-europium, cobalt-gadolinium, cobalt-erbium, cobalt-thulium, cobalt-ytterbium, cobalt-lutecium, cobalt-yttrium, cobalt-lanthanum and cobalt-mischmetal. Examples of specific ternary compounds include cobalt-cerium-praseodymium, cobalt-yttrium-praseodymium, and cobalt-praseodymium-mischmetal.

In carrying out the present process, an organic or inorganic compound of a rare earth metal and a transition metal is used sequentially which decomposes at a temperature below 1000° C. at atmospheric pressure to yield the respective metal in vapor form. Each metal vapor is sequentially condensed on the substrate to form a continuous, substantially uniform coating or layer of metal thereon. The specific thickness of each deposited layer of metal depends on the amount necessary for the subsequent formation of the desired alloy film, e.g. substantially all of each metal present is used in forming the alloy film. The deposited metals are then heated in an atmosphere in which they are substantially inert to form the desired alloy film. As the alloy is formed, the easy or preferred axis of magnetization of the alloy film aligns to a significant extent and in a direction perpendicular to the plane of the substrate.

The present process must be carried out in an atmosphere in which the reactants are inert. It can be carried out in an atmosphere such as argon or in a vacuum or partial vacuum or in many instances in hydrogen.

The non-metallic products of decomposition are gaseous and removable by a number of conventional techniques such as, for example, by a flowing atmosphere or a vacuum. Since the non-metallic products of decomposition are much less dense and significantly more easily vaporizable than the deposited metal, they do not interfere with the condensation of the metal vapor in the formation of continuous metal coatings in the present invention. The rare earth metal compound or transition metal compound used in the present invention can be a solid, liquid or gas at room temperature. The amount of compound of transition metal or rare earth metal used is determinable empirically. It should be used in an amount which, on decomposition, is sufficient to produce a significant partial pressure of metal vapor to effectively coat the exposed surface of the substrate to form a continuous coating or layer of metal thereon in the desired thickness. Specifically, the particular compound used should, when decomposed, yield a partial pressure of metal vapor of at least about $10^{-7}$ atmosphere, sufficient to effectively deposit a layer of metal on the exposed surface of the substrate. The compound of transition metal or rare earth metal may decompose to yield the respective metal vapor directly or it may decompose to yield a vapor which is then decomposed to give the metal or metal vapor. Representative of the rare earth metal organic compounds useful in the present invention are the rare earth hexafluoroacetylacetonates which decompose at a temperature of about 275° C. For example, neodymium hexafluoroacetylacetonate decomposes to yield neodymium vapor directly. Also useful are the tricyclopentadienyl rare earth compounds of yttrium, lanthanum, cerium, praseodymium, neodymium, samarium, gadolinium, dysprosium, erbium and ytterbium. Additional useful examples are the dicyclopentadienyl chlorides of the rare earth metals which are reducible by hydrogen to form the hydrides which decompose readily at temperatures below 1000° C. to produce the rare earth metal. Except for samarium, erbium and ytterbium, the rare earth chlorides, bromides and iodides are reducible by hydrogen to yield the rare earth metal.

Representative of the transition metal organic compounds useful in the present invention are the acetylacetonates, the hexafluoroacetylacetonates and the dicyclopentadienyls of cobalt, iron, manganese and nickel. Additional useful compounds are the carbonyls of cobalt, iron, manganese and nickel.

Representative of the inorganic transition metal compounds useful in the present invention are $CoCl_3$, $CoBr_3$, $NiCl_2$, $NiBr_2$, $FeCl_3$, $FeBr_3$, $MnCl_2$ and $MnBr_2$.

In the present invention, the alloy film can be composed of more than one transition metal or rare earth metal depending on the particular properties desired. A plurality of metals, for example Co, Mn and Sm can be deposited sequentially in layers in the proportion desired in the alloy and the deposited metals than heated to form the desired alloy film.

In the present invention, the substrate is a solid and should be non-magnetic or so weakly magnetic as not to diminish the magnetic properties of the magnetic film of transition metal-rare earth metal alloy formed thereon. The substrate must be substantially inert to the conditions of deposition. The size and shape of the substrate is not critical. It can be flexible or rigid depending on the particular desired application. For example, the substrate can be in the form of a tape, foil, wire or plate. Typical substrates are glass, plastic and non-magnetic metals such as aluminum and copper.

The thickness and specific composition of the alloy film formed on the substrate depends on the particular properties desired. Specifically, the alloy film is formed from at least a film-forming thickness of each deposited metal. Generally, the alloy film ranges from about 100 Angstroms to about 10,000 Angstroms, and for most applications requiring magnetic thin films, films ranging in thickness from about 300 Angstroms to 1000 Angstroms are satisfactory.

A magnetic field is applied, preferably at room temperature, to the alloy film to magnetize the film. The magnetic field is applied parallel to the easy or preferred axis of magnetization of the film which in the present invention is perpendicular to the plane of the substrate. The magnetic field should be of a magnitude which saturates the film to magnetize it uniformly. In the present process, a magnetic field of about 50 kiloersteds to 100 kiloersteds is usually sufficient. A stronger magnetic field may be used, but generally has little additional effect.

In one embodiment of the present invention, the alloy film is provided with a coating of an inert nonmagnetic material which prevents oxidation and deterioration of the magnetic properties of the alloy film. Such protective coating on the alloy film is preferably provided before the alloy film is magnetized. Typical examples of the protective coating are shellac and a ceramic such as silicon nitride which can be vapor condensed onto the alloy film by the reaction of silicon tetrachloride and ammonia.

A number of conventional techniques can be used to carry out the present process but such techniques must allow the sequential formation or deposition of rare earth metal and of transition metal on the substrate surface. Simultaneous formation or deposition of rare earth metal and transition metal does not produce the present magnetic alloy film. Specifically, simultaneous formation or deposition of rare earth metal and transition metal and subsequent heating of these metals to produce an alloy causes nucleation of a multitude of a micrograins which grow in random directions resulting in an isotropic or random orientation of the preferred axis which cannot be aligned to produce a magnetically anisotropic material. The sequence of depositing or forming the metals in the present process is not critical, but if the particular rare earth metal oxidizes readily, it is preferably deposited initially on the substrate since subsequent deposition of the transition metal thereon will inhibit oxidation.

In one technique of carrying out the present process, the rare earth compound in vapor form is passed at a significantly high vapor pressure usng an inert atmosphere such as argon as a carrier gas over a desired substrate which is heated to at least the decomposition temperature of the compound vapor. The compound vapor decomposes on contact with the hot substrate leaving a uniform coating of the rare earth metal on the substrate. The rare earth compound vapor is passed over the heated substrate until the desired amount of rare earth metal, e.g. the desired thickness of the layer of metal, has deposited on the substrate. The desired transition metal compound in vapor form can similarly be passed over the substrate to deposit the transition metal onto the deposited rare earth metal. The total amounts of rare earth metal and transition metal coated onto the substrate will determine the thickness of the transition metal-rare earth alloy film. The relative amounts of rare earth metal and transition metal present will determine the particular stoichiometry of the final transition metal-rare earth alloy. In the deposition of the rare earth and transition metals, more than one rare earth metal can be deposited simultaneously and more than one transition metal can be deposited simultaneously as long as deposition of rare earth metals and transition metals is carried out sequentially.

The present transition metal-rare earth alloy films exhibit a whole range of uses. For example, a tape, e.g., made of copper, coated with a highly magnetic transition metal-rare earth alloy, for example $Co_5Sm$, is easily wrapped to form the magnetic field in a motor or generator assembly. Another example is the use of the present films as the source of a magnetic field in a circuit using the magnetic field generated by the film to maintain the stability of a mechanical system. Also, these films are useful in magnetic bubble memory devices and deep diodes.

All parts and percentages used herein are by weight unless otherwise noted.

The invention is further illustrated by the following example.

EXAMPLE

A non-magnetic substrate of copper in the form of a flexible tape having a width of about one-half inch is used. The tape is placed in a reaction zone having an inert flowing atmosphere of argon at a pressure of about 760mm.Hg. The tape is heated and maintained at a temperature of about 600° C.

The hexafluoroacetylacetonate compound of samarium is used and is heated at atmospheric pressure in an atmosphere in which it is substantially inert such as argon or, if preferred, an argon atmosphere containing hydrogen to keep oxygen levels low. The compound of samarium is vaporized at a temperature of about 400° C. to yield a vapor which has a partial pressure of at least $10^{-7}$ atmosphere and which is carried by the flowing inert atmosphere of argon through the reaction zone over the hot copper substrate. As the vapor contacts the hot copper surface, it decomposes leaving samarium metal thereon. The vapor is passed over the hot copper surface to deposit a continuous flm of samarium metal thereon and in an amount sufficient to subsequently form the $Co_5Sm$ phase compound.

Cobalt hexafluoroacetylacetonate is heated at atmospheric pressure in an atmosphere in which it is substantially inert, such as argon, at a temperature of about 400° C. The resulting vapor has a partial pressure of at least $10^{-7}$ atmosphere and is carried by the flowing inert atmosphere of argon through the reaction zone over the deposited samarium and on contact with the hot film of samarium metal decomposes leaving cobalt metal deposited thereon. The vapor is passed over the deposited samarium to deposit a continuous layer of cobalt metal thereon and in an amount sufficient to subsequently form the $Co_5Sm$ phase compound when alloyed with the deposited samarium metal. The proper amounts of samarium metal and cobalt to be deposited are determinable empirically.

The resulting deposited layers of metal are then heated at atmospheric pressure to a temperature of about 800° c in an atmosphere in which they are inert, such as argon, to alloy them and form the $Co_5Sm$ phase.

The resulting alloy film has a thickness of about 300 Angstroms and has its easy axis of magnetization perpendicular to the plane of the substrate. A magnetizing field of about 50 kiloersteds is applied at room temperature to the alloy film perpendicular to the plane of the substrate and parallel to the easy axis of magnetization to magnetize the alloy film and form a magnetic film suitable for use in computers.

What I claim is:

1. A magnetic member consisting essentially of a non-magnetic solid substrate carrying a magnetically anisotropic film consisting of a transition metal-rare earth alloy, wherein the transition metal component is selected from the group consisting of cobalt, iron, nickel, manganese and alloys thereof, and wherein the rare earth metal component is selected from the group consisting of the 15 elements of the lanthanide series having atomic numbers 57 to 71 and the element yttrium and mixtures thereof, said alloy flim being continuous coherent and substantially uniform, said alloy film having a thickness ranging from about 100 Angstroms to about 10,000 Angstroms and having an easy axis of magnetization significantly aligned perpendicular to the plane of the substrate, and said substrate being substantially inert only at temperatures ranging up to 1000° C.

2. A magnetic member according to claim 1 wherein said alloy film ranges in thickness from about 300 Angstroms to 1,000 Angstroms.

3. A magnetic member according to claim 1 wherein the substrate is a flexible copper tape.

4. A magnetic member according to claim 1 wherein said alloy is $Co_5Sm$.

5. A magnetic member according to claim 1 wherein said alloy film has a coating of an inert non-magnetic material which prevents oxidation and deterioration of the magnetic properties of the alloy film.

6. A magnetic member according to claim 5 wherein said coating of inert non-magnetic material is shellac.

* * * * *